UNITED STATES PATENT OFFICE.

GEORGE M. PAINTER, OF ARCOLA, MISSOURI.

ALTERATIVE REMEDY.

SPECIFICATION forming part of Letters Patent No. 380,343, dated April 3, 1888.

Application filed November 26, 1887. Serial No. 256,258. (No specimens.)

*To all whom it may concern:*

Be it known that I, GEORGE M. PAINTER, a citizen of the United States, residing at Arcola, in the county of Dade and State of Missouri, have invented certain new and useful Improvements in Medical Compounds; and I do declare the following to be a full, clear, and exact description of the invention, such as will enable others skilled in the art to which it appertains to make and use the same.

My invention relates to a new and useful alterative compound to be used for purifying the blood, of which the following is a specification.

My compound consists of the following ingredients, combined in the proportions stated, viz: sarsaparilla-root, one ounce; white pond-lily root, (*Nymphæa*,) one ounce; bloodroot, (*Sanguinaria*,) one-sixteenth of an ounce; alcohol, seven ounces; water, nine ounces. These ingredients are prepared and united in the following manner: First, the roots of sarsaparilla, nymphæa, and sanguinaria are thoroughly pulverized and united in a suitable vessel, when the alcohol is added and the whole allowed to stand twelve (12) days, each ingredient in the proportion above named; second, after standing twelve (12) days the said compound is filtered, and to this tincture is added nine (9) ounces of water, when the whole ingredients are throroughly mingled by agitation, after which the compound is ready for use.

The herein-described medical compound is to be used internally, and the dose for each adult is one tea-spoonful three (3) times daily.

What I claim, and desire to secure by Letters Patent, is—

A medical compound consisting of sarsaparilla, one ounce; nymphæa, one ounce; sanguinaria, one-sixteenth of an ounce; alcohol, seven ounces; water, nine ounces, as set forth.

In testimony whereof I affix my signature in presence of two witnesses.

GEORGE M. PAINTER.

Witnesses:
   W. T. TURNER,
   D. RUSSELL.